US009654402B2

(12) United States Patent
Nooren et al.

(10) Patent No.: US 9,654,402 B2
(45) Date of Patent: May 16, 2017

(54) TELECOMMUNICATION QUALITY OF SERVICE CONTROL

(75) Inventors: Pieter Albert Nooren, Den Hoorn (NL); Mattijs Oskar Van Deventer, Leidschendam (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 505 days.

(21) Appl. No.: 13/503,389

(22) PCT Filed: Oct. 21, 2010

(86) PCT No.: PCT/NL2010/050701
§ 371 (c)(1),
(2), (4) Date: Sep. 7, 2012

(87) PCT Pub. No.: WO2011/049450
PCT Pub. Date: Apr. 28, 2011

(65) Prior Publication Data
US 2013/0039183 A1 Feb. 14, 2013

(30) Foreign Application Priority Data
Oct. 21, 2009 (EP) .................................. 09173653

(51) Int. Cl.
*H04L 12/58* (2006.01)
*H04L 12/813* (2013.01)
(Continued)

(52) U.S. Cl.
CPC .......... *H04L 47/20* (2013.01); *H04L 41/5019* (2013.01); *H04L 47/2475* (2013.01);
(Continued)

(58) Field of Classification Search
USPC ....... 370/254, 255, 230.1, 235, 236.1, 236.2
See application file for complete search history.

(56) References Cited

U.S. PATENT DOCUMENTS

2002/0118649 A1\* 8/2002 Farley .................. H04L 1/0015
370/252
2003/0088671 A1\* 5/2003 Klinker et al. ............... 709/225
(Continued)

FOREIGN PATENT DOCUMENTS

WO 02/19634 A1 3/2002
WO 2009/082806 A1 7/2009

OTHER PUBLICATIONS

International Search Report, Application No. PCT/NL2010/050701 (WO 2011/049450 A1), dated Mar. 24, 2011.
(Continued)

*Primary Examiner* — Zewdu A Beyen
(74) *Attorney, Agent, or Firm* — Banner & Witcoff, Ltd.

(57) ABSTRACT

Different quality of service policies are enforced for packets from traffic streams of different type in a communication network, according to the type of traffic types of traffic. A learning phase and an operation phase are provided. The learning phase teaching by example of characteristics that must be used to distinguish the different types of traffic. In the learning phase, an indication is received of a quality of service policy that is required for user applications of a selected type. An indication is provided indicating execution of a user application of said type in a user domain and characteristics of packet traffic are derived from inspection of packets transmitted through the communication network to and/or from the user domain during the indicated execution. In the operation phase packet traffic in the network to and/or from the user domain is inspected. It is detected whether observed characteristics of the packet traffic match the derived characteristics. When a match is detected, enforcement of the quality of service policy in the network to packet traffic of the selected type of user application is triggered.

27 Claims, 10 Drawing Sheets

(51) Int. Cl.
*H04L 12/24* (2006.01)
*H04L 12/859* (2013.01)
*H04L 12/923* (2013.01)
*H04L 12/911* (2013.01)
*H04L 12/927* (2013.01)

(52) U.S. Cl.
CPC .......... *H04L 47/762* (2013.01); *H04L 47/782* (2013.01); *H04L 47/803* (2013.01)

(56) References Cited

U.S. PATENT DOCUMENTS

| | | | |
|---|---|---|---|
| 2003/0118029 A1* | 6/2003 | Maher et al. | 370/395.21 |
| 2004/0100940 A1* | 5/2004 | Kuure et al. | 370/349 |
| 2008/0305826 A1* | 12/2008 | Morita et al. | 455/556.1 |
| 2009/0238071 A1 | 9/2009 | Ray et al. | |
| 2010/0067400 A1* | 3/2010 | Dolganow et al. | 370/253 |
| 2010/0153496 A1* | 6/2010 | Heinla | 709/204 |

OTHER PUBLICATIONS

Noirie L et al: Semantic Networking: Flow-Based, Traffic-Aware, and Self-Managed Networking. Bell Labs Technical Journal, Wiley, CA, US, vol. 14. No. 2. Jul. 1, 2009 (Jul. 1, 2009), pp. 23-39. XP001546635. ISSN: 1089-7089.

"Telecommunications and Internet converged Services and Protocols for Advances Networking (TISPAN)" (Draft ETSI TR 182 010 V0.0.6 (Mar. 2009).

* cited by examiner

TELECOMMUNICATION QUALITY OF SERVICE CONTROL

CROSS-REFERENCE TO RELATED APPLICATIONS

This application is a U.S. National Stage application under 35 U.S.C. §371 of International Application PCT/NL2010/050701 (published as WO 2011/049450 A1), filed Oct. 21, 2010, which claims priority to Application EP 09173653.8, filed Oct. 21, 2009. Benefit of the filing date of each of these prior applications is hereby claimed. Each of these prior applications is hereby incorporated by reference in its entirety.

FIELD OF THE INVENTION

The invention relates to data transmission via a telecommunication network and control of quality of service of such data transmission.

BACKGROUND

Data transmission through a telecommunication network for different applications may be performed with different quality of service. More bandwidth may be reserved for one application than for another, for example, packets may be given different treatment, delays in responses to requests may be shorter, or more average bandwidth may be available.

In the prior art various ways of adapting quality of service are known. This may involve adapting the parameters that affect quality of service for an application. Adaptation of a parameters that affect quality of service is known from an article by L.Noirie et al, titled "Semantic Networking: flow-based traffic-aware and self-managed networking", published in the Bell Labs Technical Journal Vol 14 No 2 pages 23-39 (EPO reference XP001546635). parameter adaptation is also known from WO2009/082806.

Different adaptations may be needed for different applications, both due to differences in data traffic and maximum resources allocated for different types of applications. In the past, different quality of service policies for network transmission were provided only for data from a small number of fixed applications that were provided by the network operator (e.g. telephone calls), whereas all other data received the same undifferentiated quality of service, e.g. according to best effort, such as best effort Internet service.

Network based access control (NBAC) has been proposed to provide for more refined enforcement of different quality of service policies for data flows from different applications running at network terminal devices of a telecommunication network. When NBAC is used, different types of data flow are defined. A Resource and Admission Control Sub-system (RACS) is instructed to control allocation of resources in the network for packets of active data flows, dependent on the quality of service policy that has been defined for the data flow. Instructions from NBAC to RACS are triggered by the start of the data flow, which may be signalled explicitly or detected by means of deep packet inspection (DPI).

To apply network based access control, the network needs to have information that identifies different types of data flow and their associated quality of service policy. This may be done by explicitly identifying different types of data flow (associated with different types of application) and their respective quality of service policies in advance.

US2009/238071 proposes to use signatures of the streams to indentify different streams. The signatures are based on data derived from DPI. The document points out that when a new application or protocol is encountered, the data packets of the new application are analyzed and an appropriate signature is developed and added to a database, typically referred to as a signature library. Packets transmitted by a particular application or protocol are received, and the packets are analyzed using deep packet inspection to generate a signature. The signature may then be compared to entries in the signature library, and if a match is found, the data packets are identified as being associated with a particular application or protocol identified in the signature library. This could be done by a human system operator. The document does not explain how it is done. There is no indication that the system is designed to assist application owners from outside network management to enable them to define signatures.

WO02/19634 similarly discloses the use of DPI signatures to identify the type of application. The proposed system has a user management interface and a microcomputer is used recompile signature databases to accommodate new signatures. The microcomputer can also be used to learn and unlearn sessions identified by the traffic flow scanning engine. There is no indication that the system is designed to assist application owners from outside network management to enable them to define signatures.

As long as the number of applications remains small, the network operator may be expected to define the associated types of data flow and their quality of service policies. But it is envisaged that an increasing number of different applications will each require their own quality of service policy. Different known applications already include various forms of video play, teleconferencing, gaming etc. In view of the increasing number of different applications, it has been proposed to allow users of the network to define types of data flow and their quality of service policies from outside the network.

For new applications, or applications that are run infrequently in the same network, this may mean that the type of data flow and the associated quality of service policy may need to be defined from user terminals. In other words, this may mean that predefined quality of service policies for predefined types of data flow in network may not suffice. However, this raises a threshold for effective quality of service control, because users cannot always be expected to have the expertise required to identify and define types of data flow and associated quality of service policies.

WO03/065228 proposes a solution to lower this threshold. The document proposes to provide for the use of learning techniques in the communication network to adaptively "learn" the quality of service policy configuration that is needed for an application running in a user terminal When the user terminal submits a flow request for a new identified type of data flow, the network adapts its service rate or resource allocation until the needs of the new type of data flow are met. The network records the resulting service rate or resource allocation. Subsequently, when a user terminal starts another session of the same type, the network uses the recorded information to set the quality of service policy for that session.

Although the automatic selection of the quality of service policy based on actual performance of an example session simplifies control over telecommunication network based differentiation of quality of service policies from outside the network, it does not entirely remove the threshold. The application of the technique is limited to applications that report sessions with the identified type of data flow to the telecommunication network. Applications that do not do so would have to be modified to identify themselves.

SUMMARY

Among others, it is an object to simplify control over telecommunication network based differentiation of quality of service policies by users from outside the network.

A method according to claim 1 is provided. This method provides for a learning phase for automatically teaching a network conditions for triggering specific enforcement strategies. An indication indicating execution of a user application in a user domain is provided when the conditions must be learnt, and packets transmitted during the indicated execution machine learning are used to determine the conditions. The learning phase may be started in response to a signal from a user for example, so that the user known when to start the user application. A request signal to start the learning phase may be used, the request comprising information about the application that is supplied by the user. In an embodiment a message to a user to start the user application of the selected type for use in said learning phase may be provided.

The method provides for triggering of enforcement of different quality of service policies in a communication network for types of user applications using the conditions that have be learnt in this way. In exemplary embodiments triggering may be used to reserve bandwidth in the communication network for future packets involved execution of a selected type application, or to control the treatment that will be given to such future packets.

A user may want to get a special quality of service for a specific type of traffic, for example to enjoy good service for important applications or to reduce costs charged by the network provider. Similarly, an application program may be configured to arrange for its own quality of service level. When the method is available, the user is enabled to teach the network the conditions for triggering enforcement by indicating when an example of an application of said type is executed. Similarly, an application program that is designed without using knowledge about the network can act as a user to teach these conditions.

During indicated execution of an application, that is, for example after an indicated start of execution, characteristics of packet traffic are derived from inspection of packets transmitted through the communication network to and/or from the user domain, by means of inspection by a quality of service level learning module of the network or a local quality of service level learning module in the user domain. These packets may be inspected in the network for example, or in the user domain before or after transmission. In the operating phase the derived characteristics are used to trigger application of a corresponding quality of service policy.

In an embodiment the derivation of characteristics and detection to perform triggering are performed by a Deep Packet Inspection module and enforcement of the quality of service policy is performed by a Resource and Admission Control Sub-system.

In an embodiment applications executed in the user domain that are not of the selected type are deactivated before derivation of the characteristics.

In an embodiment the network may have a channel for receiving commands from users to perform derivation of characteristics from packets for use in triggering enforcement of a selected quality of service policy.

In an embodiment the method is executed by means of a programmable computer with a computer program that is configured to cause the computer to execute the method.

BRIEF DESCRIPTION OF THE DRAWING

These and other objects and advantageous aspect will become apparent from a description of exemplary embodiments, using the following figures.

DETAILED DESCRIPTION OF EXEMPLARY EMBODIMENT

Figure 1:
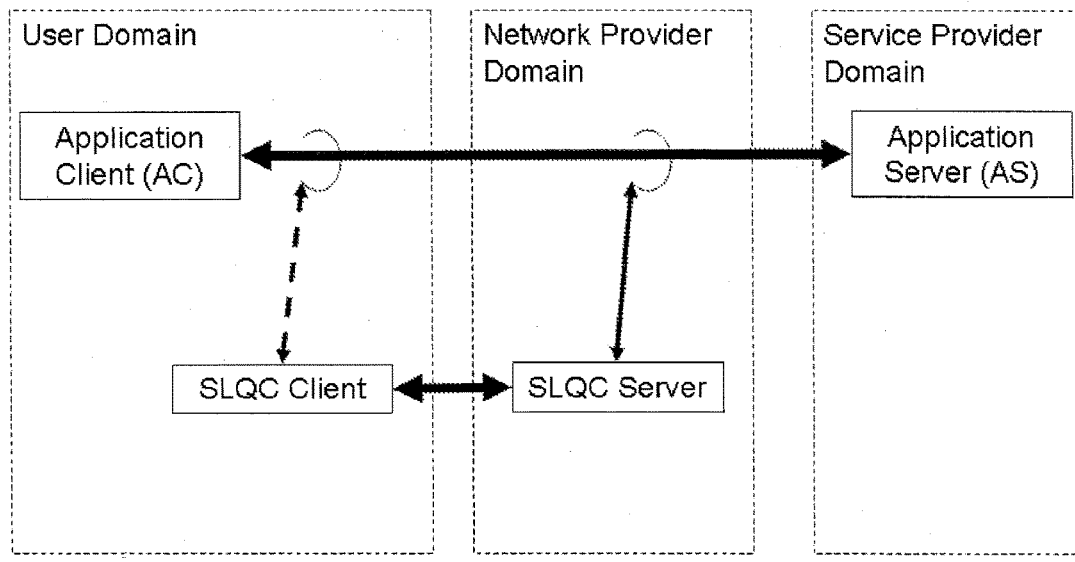
FIG. 1 shows a telecommunication architecture

FIG. 1 shows a telecommunication architecture, wherein a user domain, a network provider domain and a service provider domain are distinguished. By way of example, the user domain may represent a single user terminal device or a home network with a plurality of interconnected devices. This device, or these devices are programmed to execute an application client program and a Self-Learning QoS Control (SLQC) client program.

Similarly, the service provider domain may represent a single server terminal device or a server network with a plurality of interconnected devices for example. This device, or these devices are programmed to execute an application server program. In operation, the application client (AC) in the user domain exchanges application traffic with an application server (AS) in the service provider domain. This may involve a data flow comprising a stream of packets transmitted from the application server to the application client and/or a stream of packets in the opposite direction.

The network provider domain may comprise a cable network, a wireless network and/or a telephone network etc including equipment to control transmission via these media. Equipment in the network provider domain is programmed to run a Self-Learning QoS Control (SLQC) server program. The term "domain" is used to indicate different spheres of influence: the user is able to arrange the user domain as desired but not the network provider domain or the service provider domain. Similarly, the network provider and the service provider have full control at most only over their respective domains. The device or devices in the user domain communicate with a device or devices in the service provider domain via media in the network provider domain, such as communication lines, routers, temporary storage devices etc, under control of equipment in that domain. The media and the control equipment may be shared resources, in the sense that they may be used by devices from a plurality of user domains. Limited availability of these shared resources may give rise to limitation of available bandwidth, delays jitter or even loss of transmission packets, which affects quality of service.

Figure 2:
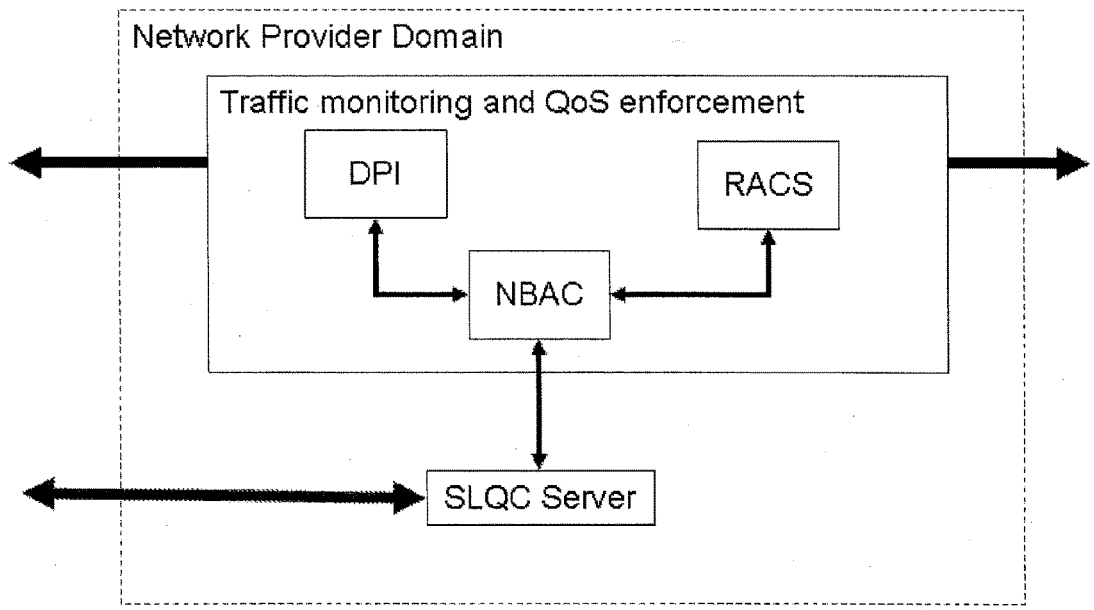
FIG. 2 shows modules in a network provider domain

FIG. 2 shows a various modules in the network provider domain in more detail, including a Deep Packet Inspection module (DPI), a Network Based Access Control module (NBAC) and a Resource and Admission Control Sub-system (RACS). Network Based Access Control module (NBAC) has communication links to Deep Packet Inspection module (DPI) and Resource and Admission Control Sub-system (RACS). The SLQC server has a communication link to Network Based Access Control module (NBAC). The SLQC server has access to the application traffic through the Deep Packet Inspection module (DPI) and Network Based Access Control module (NBAC). Moreover, the SLQC server has a direct communication link to the SLQC client in the user domain (not shown).

The Resource and Admission Control Sub-system (RACS) controls enforcement of quality of service policies. For example a quality of service policy may define an amount of bandwidth that must be reserved for a specific type of traffic, or a maximum bandwidth above which it is allowed to drop packets of a specific type of traffic. Additionally a quality of service policy (also called traffic policy) may define maximum transmission delays, maximum jitter in delay, a priority level to be assigned to the traffic, whether it is allowed to drop packets under specific circumstances etc. Resource and Admission Control Sub-system (RACS) may provide for different treatment of transmitted packets, according to the type of traffic to which the packets belong. Thus for example, differentiated treatment may involve processing packets in order of priority, dropping selected packets of different types of traffic, or postponing their transmission, in the case of different levels of resource shortage, or limiting the length of packets or messages that are transmitted without postponement to different lengths according to the type of traffic. The quality of service policy may define the criteria for applying different treatments, such as the priority levels. Similarly, the quality of service policy may define other criteria for applying different treatments, such as a threshold level of resource shortage above which packets of a specific type of traffic may be dropped or above which their transmission may be postponed, or a threshold length of packets, or groups of packets that contain a larger message, of a type of traffic above which postponement of transmission is allowed.

The Resource and Admission Control Sub-system (RACS) performs resource reservation and access control to enforce quality of service policies. In an embodiment, it may be configured to block or pass selected packets, or to assign different priorities to different packets, according to the data flow to which the packets have been detected to belong. In an embodiment, it may reserve bandwidth for transmission of future packets of a specific data flow in advance, preventing that this bandwidth will be used for packets from other data flows, and later use part of the reserved bandwidth when the packets arrive. In an embodiment, it may throttle traffic of a specific data flow, for example by dropping packets without completing their transmission. RACS signalling is standardised by ETSI and ITU (ITU calls it RACF). The Resource and Admission Control Sub-system (RACS) may be implemented as defined for Next Generation Networks. The Resource and Admission Control Sub-system (RACS) may control a resource at the edge of the network for example, that is used to service a group of subscribers.

The Network Based Access Control module (NBAC) configures RACS for specific application traffic, using input from the Deep Packet Inspection module (DPI), about the traffic of the application and/or users, based on explicit requests. To do so, the Network Based Access Control module (NBAC) supplies an identification of the relevant type of traffic and a definition of the quality of service policy that must be enforced for that type of traffic.

The Deep Packet Inspection module (DPI) has access to packets in the network that are transmitted to and/or from the user domain. The Deep Packet Inspection module is configured to monitor and characterize application traffic and to distinguish different type of traffic, detect its characterizing parameters and analyses its traffic pattern. Methods and devices to do so are known per se. DPI modules are typically implemented using non standardised proprietary technologies, under control of the network provider.

In operation, the system operates alternately in a learning mode, a monitoring mode and an enforcement mode for a plurality of different types of packet traffic in the network provider domain, in which it executes a learning phase, a monitoring phase and an enforcement phase of processing for the relevant type of traffic respectively. Different modes may apply concurrently for different types of traffic. Quality of service policies and trigger conditions are recorded, each for a respective one of the types of packet traffic to and/or from an individual user domain. In the monitoring phase, Deep Packet Inspection module (DPI) uses the recorded trigger conditions to detect whether a data flow of traffic of a defined type of traffic to and/or from the user domain has started. When Deep Packet Inspection module (DPI) detects this, deep Packet Inspection module (DPI) sends a trigger signal to the Network Based Access Control module (NBAC).

When the Network Based Access Control module (NBAC) receives this trigger signal, it switches the system to the enforcement phase for the detected type of traffic for the individual user domain. The Network Based Access Control module (NBAC) sends an instruction to Resource and Admission Control Sub-system (RACS), identifying the data flow, quality of service policy associated with the detected type of data flow, and the individual user domain for which the data flow was detected. In response, Resource and Admission Control Sub-system (RACS) control resources and admission throughout the network, for packets that belong to the data flow of the identified type. The enforcement phase may end when Resource and Admission Control Sub-system (RACS) no longer receives detections of relevant traffic from Deep Packet Inspection module (DPI), or when an end of the data flow is signalled explictly.

Operation in the learning phase is started by a signal from the user. In the learning phase the Deep Packet Inspection module (DPI) and the SLQC system (the SLQC server and/or client) cooperate to derive characteristics of a type of data flow that will be used by the Deep Packet Inspection module (DPI) in the monitoring phase to detect whether the trigger signal should be sent for that type of data flow. Thus, Deep Packet Inspection module (DPI) is used for at least two purposes: it serves to provide trigger signals to the Network Based Access Control module (NBAC) to start enforcing a Quality of Service policy for packets from a selected data flow and it serves to derive characteristics in the learning phase, to teach parameters that will be used for said triggering.

Figure 3:
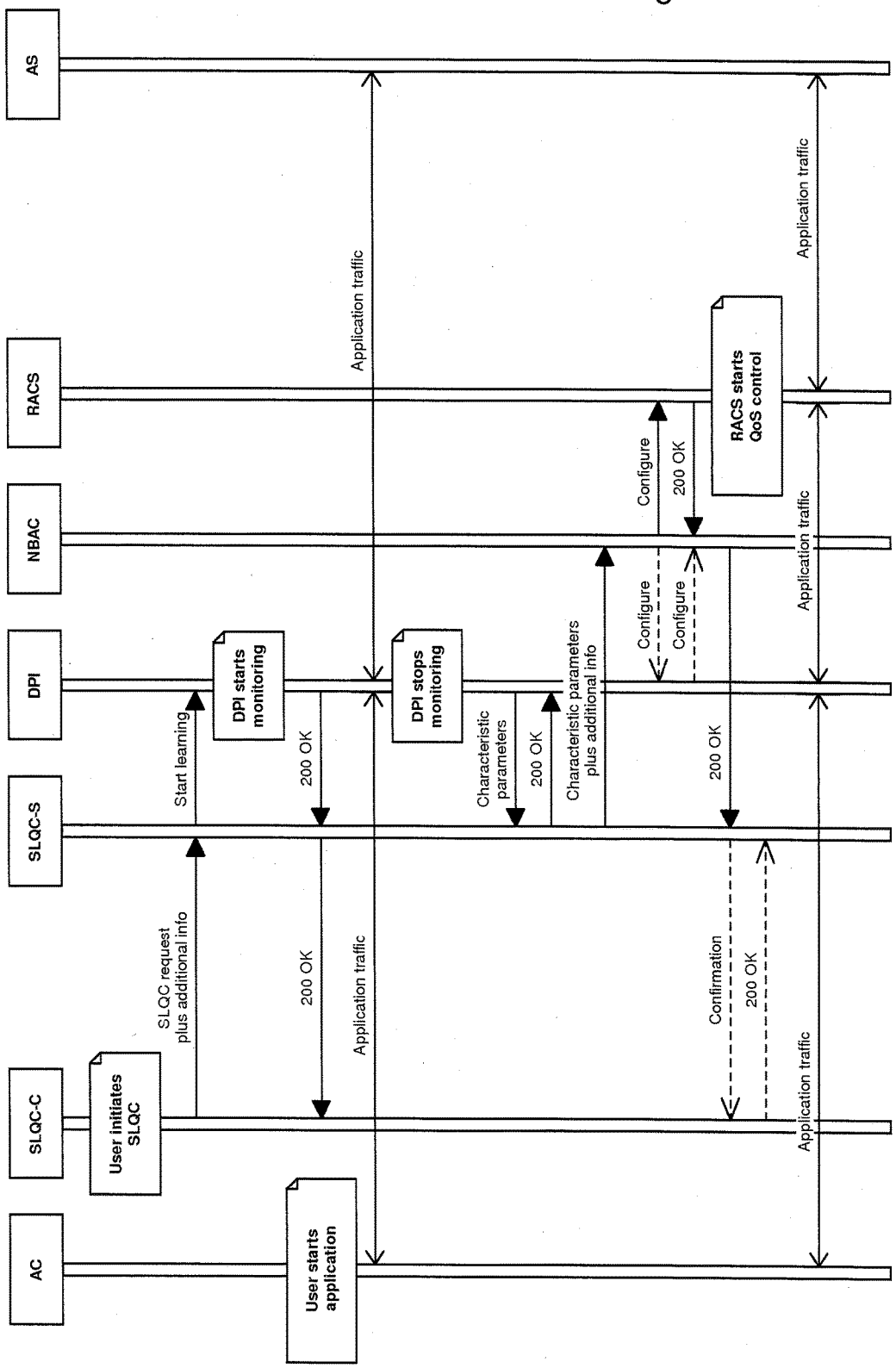
FIG. 3 shows a sequence diagram of SLQC application teaching
Figure 3A:
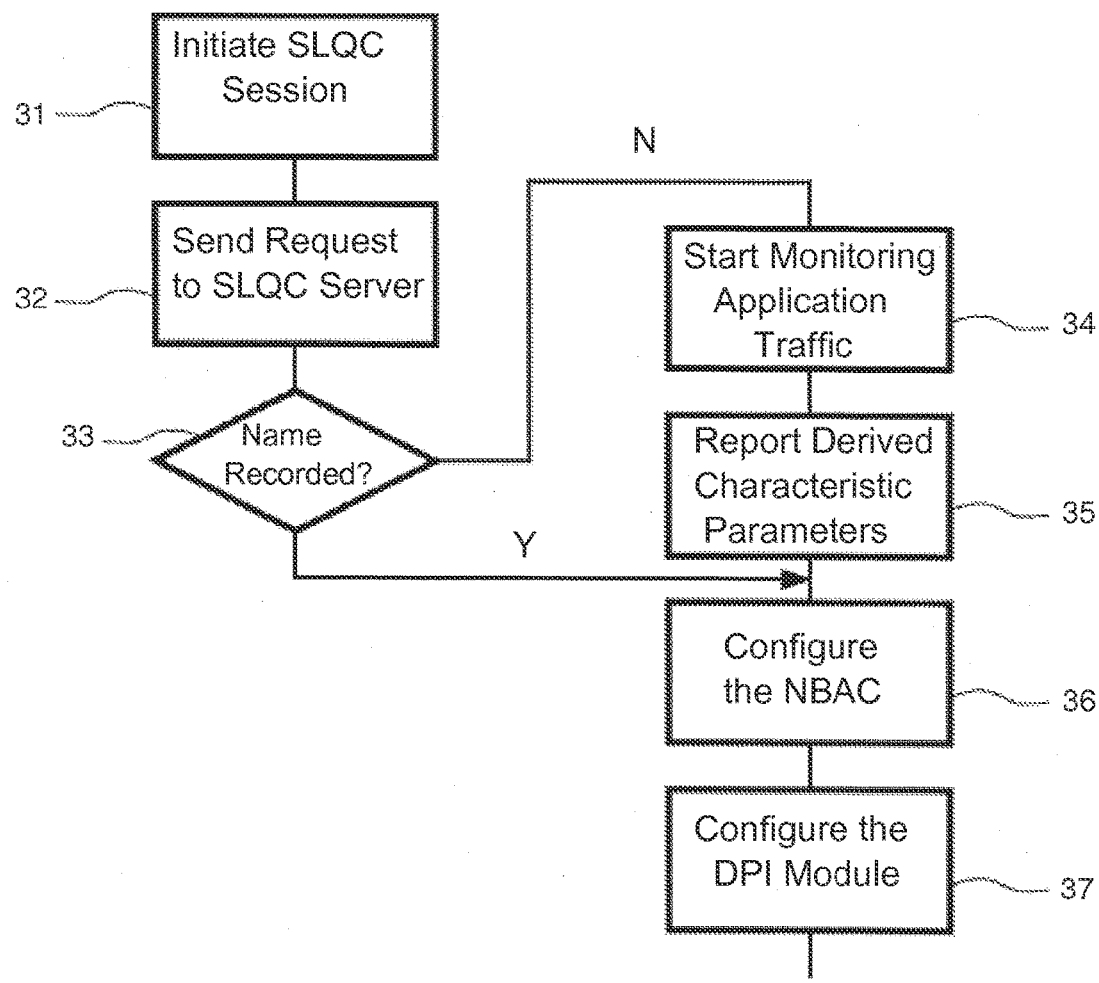
FIG. 3a shows a flow chart of application teaching

FIG. 3 shows a typical sequence diagram of teaching a new application to the SLQC system. FIG. 3a shows a flow chart of this process. The process comprises the following steps. In a first step 31 a user indicates to the SLQC client that an SLQC session must be initiated. In response the SLQC client performs a second step 32, sending an SLQC request to SLQC server. This request may contain information supplied by the user, e.g. the name of the application, and parameters of the required quality of service (e.g. required bandwidth, a maximum acceptable delay, jitter, packet loss rate).

In a third step 33 the SLQC server searches a record of application names of applications that have been defined previously, to determine whether the name of the current application provided in the SLQC request was previously recorded. If the application name is not found, the SLQC server responds to the request by starting a learning phase involving a fourth step 34 and a fifth step 35, by instructing the Deep Packet Inspection module (DPI) to execute the fourth step 34, starting monitoring application traffic. If a record of an application with the name is found in third step 33, the learning phase is skipped and a sixth step 36 is executed.

After the initiation of the SLQC session the user starts the application client (AC) and subsequently uses it. Optionally, fourth step 34 comprises transmitting a message to the user to do so. As a result of use of the application client (AC), the application client (AC) generates application traffic. During the learning phase, in the fourth step 34, the Deep Packet Inspection module (DPI) monitors this traffic and derives characteristic parameters to recognize this traffic. Typical parameters are one or more of: IP addresses of destinations or sources, port numbers of destinations or sources, type of traffic, URLs, service identifications, protocol identifications, specific protocol info (e.g. carried in sip invite, igmp join/leave and rstp Play/Stop messages). Optionally, Deep Packet Inspection module (DPI) also monitors traffic parameters, like average bandwidth and peak bandwidth used by this traffic.

In a fifth step 35, the Deep Packet Inspection module (DPI) reports the derived characteristic parameters to the SLQC server and the derived characteristics are recorded in association with the name of the application. In an embodiment, the record may be shared between a plurality of user domains, for use third step 33. Fifth step 35 may be triggered by a timer, by a signal from the user, by the SLQC-server, or when the DPI detects that it has collected at least a predetermined amount of information.

In a sixth step 36 the SLQC server uses the parameters, or the recorded parameters associated with the application name and optionally the additional information from the SLQC request to configure the Network Based Access control module (NBAC) for the current user domain.

From this step, the network may operate in an operating phase that comprises a monitoring phase and an enforcement phase. In an seventh step 37, which is part of the monitoring phase, the Network Based Access control module (NBAC) configures the Deep Packet Inspection module (DPI) to detect the presence or absence of the specific application traffic to or from the current user domain with characteristics that match the derived characteristics, and to inform the Network Based Access control module (NBAC) of such detection. Optionally, the end of the learning phase and the start of the enforcement phase is signalled to the user.

In the monitoring phase, the Network Based Access control module (NBAC) waits for information about detection of such traffic. Each time when the Deep Packet Inspection module (DPI) detects such traffic, it informs the Network Based Access control module (NBAC) about detection. The Network Based Access control module (NBAC) responds to this information by configuring the Resource and Admission Control Sub-system (RACS) to apply quality of service control to the application traffic to or from the user domain. Thus, the enforcement phase is entered.

Figure 4:
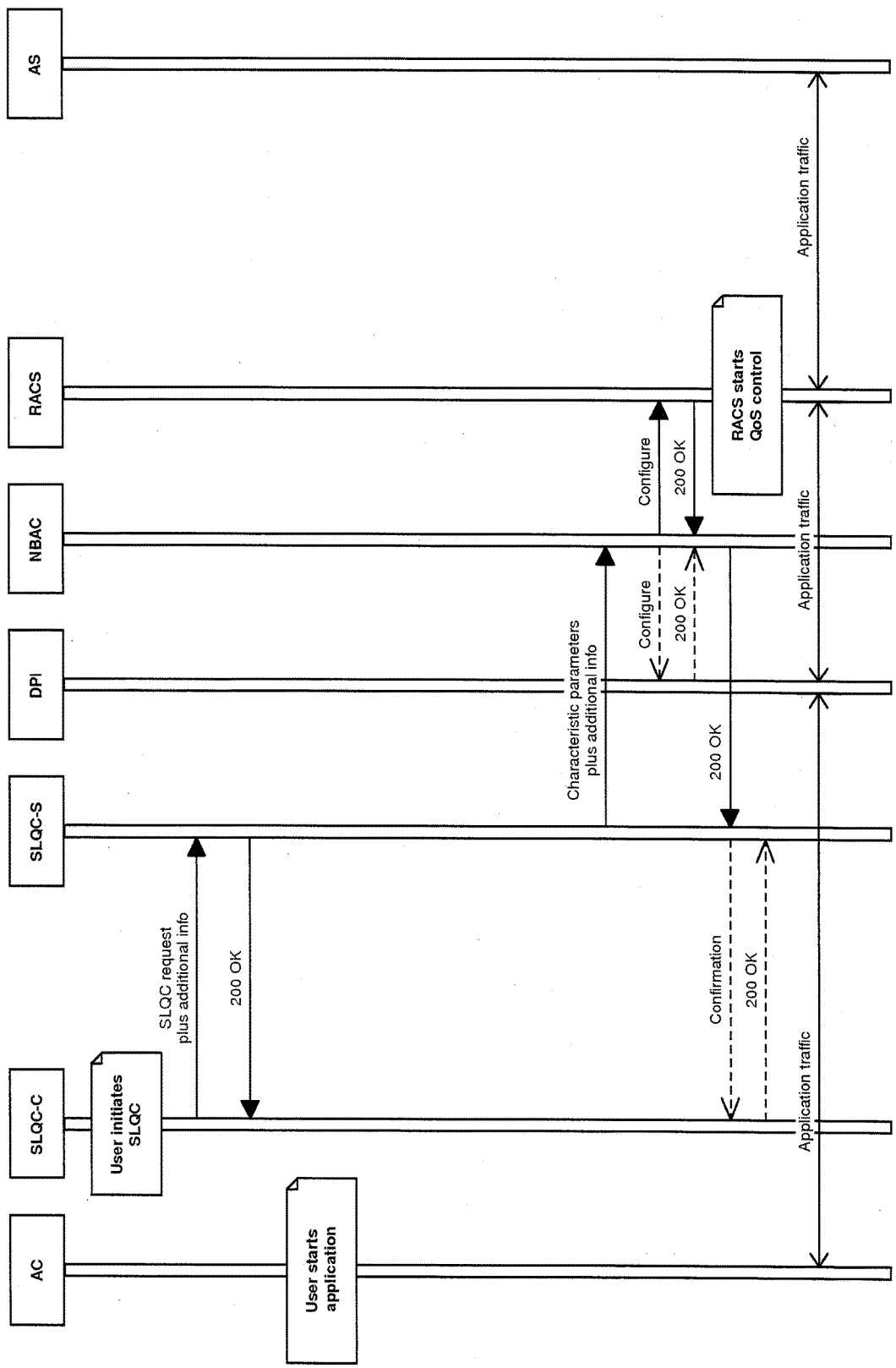
FIG. 4 shows a sequence diagram after SLQC application teaching

FIG. 4 shows use of the application program when in the third step the SLQC server recognizes the name of the application. This may be because the application has been defined from another user domain already. In this case the process immediately proceeds from the third step 33 to the sixth step 36, skipping the learning phase. Of course, repetition of sixth step 36 and seventh step 37 may be omitted if the Network Based Access control module (NBAC) has already executed these steps for the application. In an embodiment wherein definitions of applications from different user domains are not shared third step 33 may be omitted and the process may proceed from second step 32 to fourth step 34.

As shown in FIG. 4, in the first step 31 the user initiates SLQC session. In the second step 32 the SLQC client sends an SLQC request to the SLQC server. This request may contain additional information fed in by the user, e.g. the name of the application, required bandwidth, QoS requirements (e.g. sensitivity to delay, jitter, and packet loss). In the third step 33 the SLQC server searches a record of application names of applications that have been defined previously for the name of the application provided in the SLQC request. When the SLQC server recognizes the name of the application it skips the learning phase and immediately proceeds to the sixth step 36.

Figure 5:
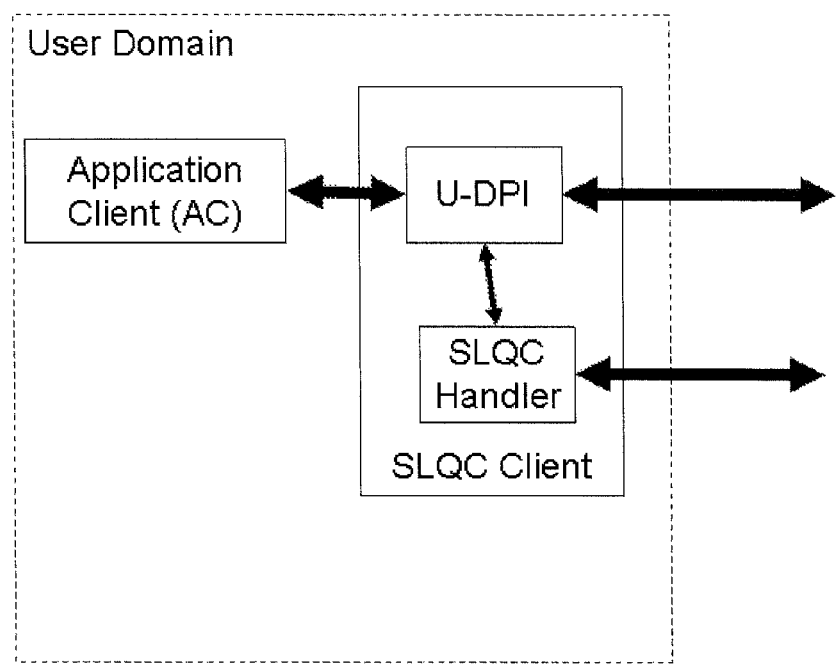
FIG. 5 shows a further network architecture

FIG. 5 shows a network architecture for use in an alternative embodiment wherein the characterizing parameters and/or the traffic pattern are determined locally in the user domain by the SLQC client. In this embodiment the SLQC client comprises an SLQC Handling module and a U-DPI module. The SLQC Handling module is configured to execute an SLQC protocol with the SLQC Server, the SLQC processing and the control of the U-DPI module. The U-DPI module is configured to perform User Deep Packet Inspection, which involves monitoring incoming and outgoing traffic to/from the user domain.

Figure 6:
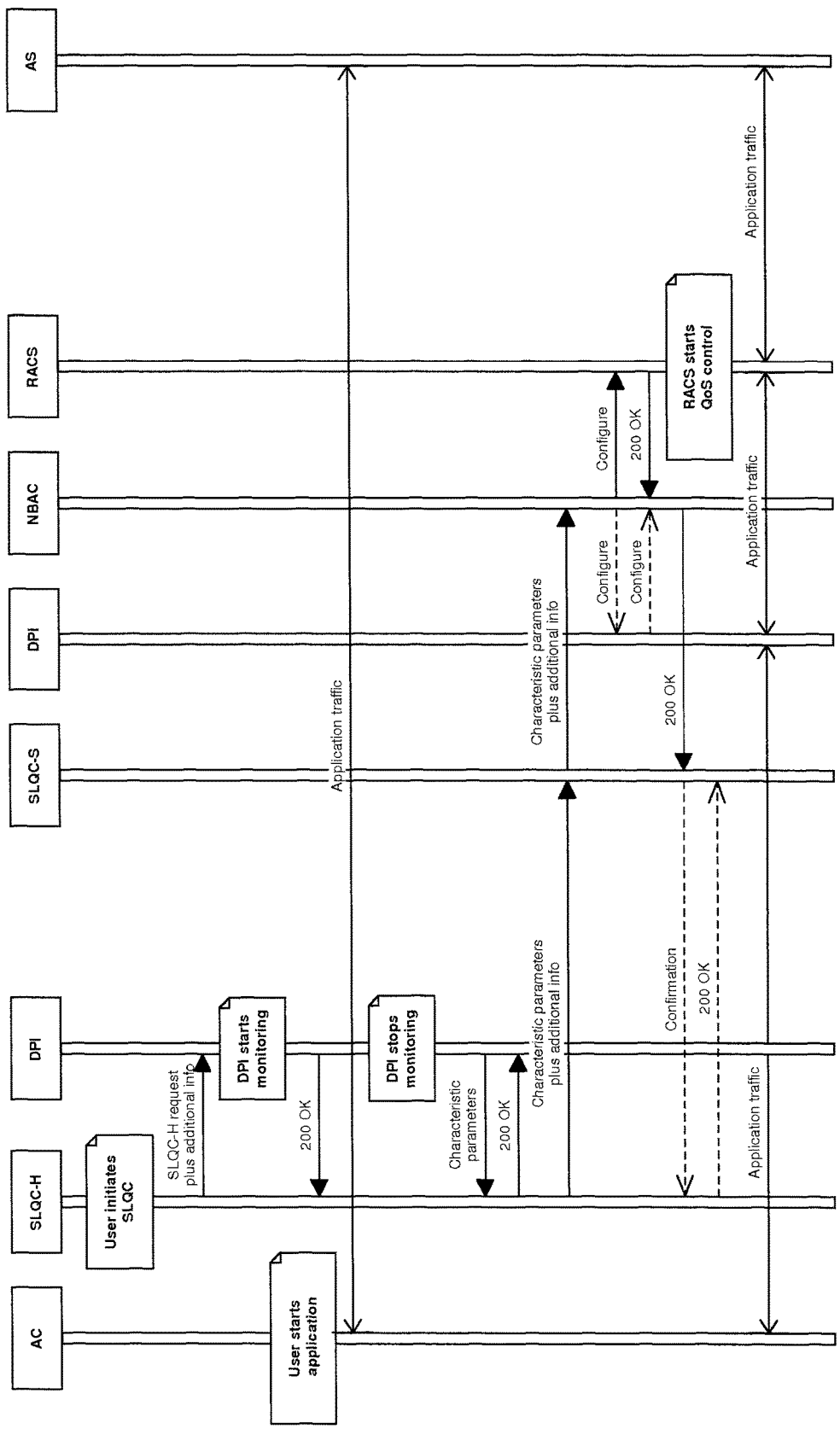
FIG. 6 shows a sequence diagram of SLQC application teaching
Figure 6A:
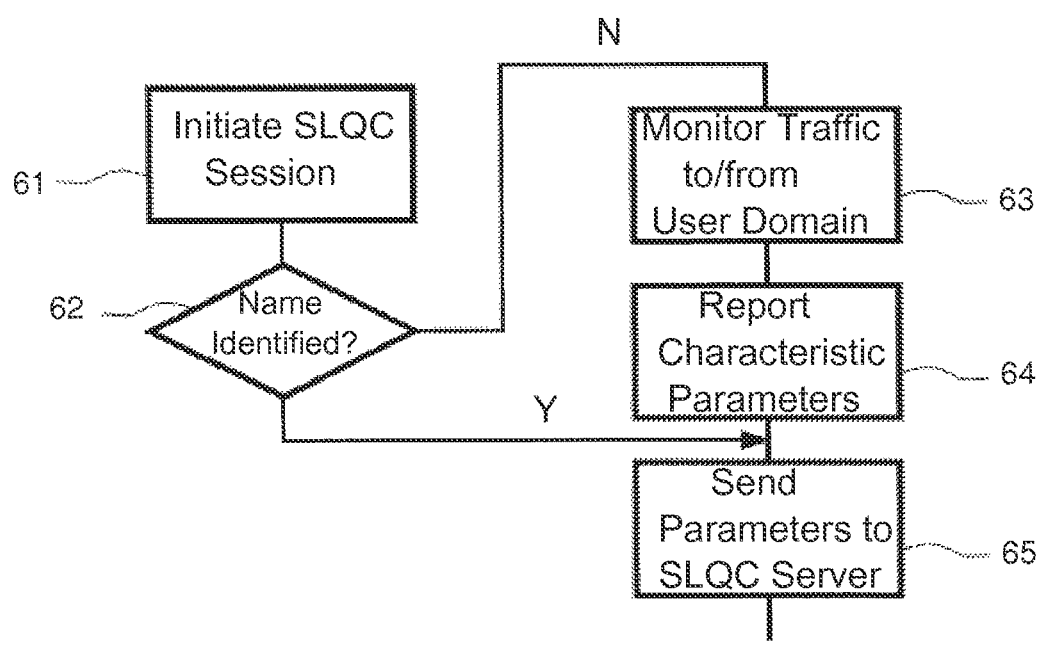
FIG. 6a shows a flow chart of application teaching

FIG. 6 shows a sequence diagram of operation according to the embodiment of FIG. 5. FIG. 6a shows a flow chart of this process. In a first step 61 the user initiates SLQC session. After initiation of the SLQC session the user starts the application and subsequently uses it. As a result, the application generates application traffic. In an embodiment a record of application names and associated derived characteristics may be stored in a third party device that is accessible from a plurality of different user domains, so that the learning phase can be skipped for all user domains when a record has been provided from any one application domain. In a second step 62 the SLQC Handling module optionally searches the record of previously defined application names, to determine whether the session involves an as yet undefined application names. If so SLQC Handling module instructs the U-DPI module to perform a third step 63. If the application name is found, the SLQC Handling module skips to a fifth step 65.

In a third step 63 the U-DPI module monitors the traffic to and/or from the user domain after the user has started the application and derives characteristic parameters to recognize this traffic. Optionally, third step 63 comprises sending a message to the user to start the application. Typical parameters are one or more of IP addresses of destinations or sources, port numbers of destinations or sources, type of traffic, URLs, service identifications, protocol identifications, specific protocol info (e.g. carried in sip invite, igmp join/leave and rstp Play/Stop messages). Optionally, the U-DPI module also monitors traffic parameters, like average bandwidth and peak bandwidth. In a fourth step 64 the U-DPI module reports the derived characteristic parameters to the SLQC-handler and the derived characteristic parameters are recorded in association with a name of the application. The fourth step 64 may be triggered by a timer, externally (e.g. by the user, or the SLQC handler), or when the U-DPI detects it has collected more than a predetermined amount of information.

In a fifth step 65 the SLQC handler sends the derived parameters and the additional info, or information that was previously recorded for the application name, from the user domain to the SLQC-server. From this point the normal NBAC procedures apply, similar to the operating phase described in the context of FIG. 3a.

An advantage of the client-learning embodiment of FIG. 6a is that it simplifies the network. On the other hand, a U-DPI can be quite complex, requiring a lot of processing power and slowing down the applications running on the user equipment.

The process comprises a derivation step, of which the fourth step 34 of the process of FIG. 3a and third step 63 of FIG. 6a are examples. The derivation step is used to obtain parameters that will be used by the Deep Packet Inspection module (DPI) in the monitoring phase to trigger the Network Based Access Control module (NBAC) to enter the enforcement phase and activate the Resource and Admission Control Sub-system (RACS) to enforce a selected Quality of service policy.

The Deep Packet Inspection module (DPI) selects the type of characteristics that will be derived in the derivation step in correspondence with the type of detection that will be performed by the Deep Packet Inspection module (DPI) during the monitoring phase to trigger the Network Based Access Control module (NBAC). For example, in one embodiment Deep Packet Inspection module (DPI) triggers the NABC based in a comparison of packet destination or source addresses of packets from or to the user domain and/or port numbers of these packets with reference addresses and/or port numbers. In this embodiment Deep Packet Inspection module (DPI) derives the reference addresses and/or port numbers as characteristics in the derivation step.

The same reference addresses and/or port numbers may be used by Admission Control Sub-system (RACS) to select service provided for individual packets (e.g. whether or not to use reserved bandwidth, whether or not to drop the packet in the case of busy traffic, to order a priority of transmission of different packets etc) . But such an identity of reference addresses and/or port numbers is not necessary: the reference addresses and/or port numbers that are used for triggering enforcement by the Deep Packet Inspection module (DPI) may differ from reference addresses and/or port numbers used by the Admission Control Sub-system (RACS) to select service provided for individual packets.

For example, a comparison with reference port numbers that are used only at the start of a session, to set-up the session, may be used to trigger enforcement by the Deep Packet Inspection module (DPI), whereas other port numbers or addresses, which are used for the bulk of transmission may be used by the Admission Control Sub-system (RACS) to select service provided for individual packets. In this embodiment Deep Packet Inspection module (DPI) may be configured to derive further addresses and/or port numbers when it triggers enforcement for use by Admission Control Sub-system (RACS). For example, Deep Packet Inspection module (DPI) may be configured to count a frequency with which respective addresses and/or port numbers are used in a predetermined time interval from detection of a match with the derived characteristics, and to provide the most frequently used addresses and/or port numbers that are consistent with the application to the Network Based Access Control module (NBAC) for use to select packets by the Admission Control Sub-system (RACS).

Optionally, Deep Packet Inspection module (DPI) may provide for additional measures to prevent derivation of reference addresses and/or port numbers that are unrelated to the application for which the characteristics are derived. In an embodiment, the SLQC client may be configured to request the user to temporarily suspend other applications during the learning phase. In this way it may be promoted that no packets with unrelated addresses and/or port numbers are transmitted during the derivation step.

In an embodiment, the Deep Packet Inspection module (DPI) is configured to eliminate predetermined addresses and/or port numbers that are associated with known applications other than the application for which the reference addresses and/or port numbers are derived. In this embodiment the Deep Packet Inspection module (DPI) is configured to select not-eliminated addresses and/or port numbers for use as reference addresses and/or port numbers in the derivation step.

In an embodiment, the Deep Packet Inspection module (DPI) is configured to select the derived characteristics based on a statistical analysis. For example, the Deep Packet Inspection module (DPI) may be configured to compute counts of the number of packets with respective addresses and/or port numbers or combinations thereof detected in the derivation step, only the addresses and/or port numbers with the highest ranking counts being derived for use as reference addresses and/or port numbers to trigger enforcement. In an embodiment, the Deep Packet Inspection module (DPI) may be configured to detect frequencies of packets with respective addresses and/or port numbers or combinations thereof prior to the start of the application, for example by counting in a time interval before the user indicates the start of the application. The Deep Packet Inspection module (DPI) may be configured to derive predicted counts of packets respective addresses and/or port numbers in the derivation step. In this embodiment, the Deep Packet Inspection module (DPI) may be configured to derive only the addresses and/or port numbers with the highest ranking difference between the actual count and the predicted count in the derivation step for use as reference addresses and/or port numbers to trigger enforcement.

It should be appreciated that it is possible to use characteristics other than packet destination or source addresses of packets from or to the user domain and/or port numbers of these packets to trigger enforcement. In this case the Deep Packet Inspection module (DPI) may be configured to derive these characteristics in the derivation step.

For example, in addition to addresses and/or port numbers, bandwidth use by packets with these addresses and/or port numbers, or the frequency of such packets may be used to trigger enforcement. In this case, the Deep Packet Inspection module (DPI) may be configured to determine bandwidth or frequency threshold of packets to or from the user domain in the derivation step, for subsequent use in triggering enforcement. In an embodiment the Deep Packet Inspection module (DPI) may be configured to count packets for respective addresses and/or port numbers and/or determine the sum of the lengths of these packets, and to derive a threshold frequency and./or sum of length from this. The count and/or sum of the lengths may be converted to a count and/or length per unit time and a predetermined fraction of this count and/or length per unit time in the derivation step, say 0.8 of it, may be derived as characteristic threshold during enforcement.

As another example protocol identification labels from the packets may be used to trigger enforcement, on their own, or in combination with other characteristics. In this case, the Deep Packet Inspection module (DPI) may be configured to use protocol labels from packets to or from the user domain, as detected by the Deep Packing Inspection module (DPI) during the derivation step. The Deep Packet Inspection module (DPI) may be configured to use these labels to derive characteristics.

As further example packets content other than addresses, port numbers and protocol labels may also be used to trigger enforcement, on its own, or in combination with other characteristics. In this case, the Deep packet Inspection module (DPI) may be configured to determine such other information and the Deep Packet Inspection module (DPI) may be configured to use this information to derive characteristics.

As further example, transmission of a combination of packets with predetermined addresses, port numbers, protocol labels and/or other content within a time interval of a predetermined time duration may be used to trigger enforcement. In this case, the Deep Packet Inspection module (DPI) may be configured to record that a combination of packets has been transmitted to and/or from the user domain during the derivation step, as well as predetermined information from the packets, such as addresses, port numbers, protocol labels and/or other content of these packets, and to supply the result of the recording as a derived characteristic for use to trigger enforcement.

In an embodiment, selection of derived characteristics in the derivation step may be performed based on information from packets to and/or from the user domain during the derivation step. In another embodiment other information may be used as well. For example, the Deep Packet Inspection module (DPI) may be configured to compare derived traffic characteristics for one or more other previously defined applications and to use detected differences for the selection of characteristics for triggering enforcement for a new application, so that characteristics that distinguish traffic of the new application from traffic of the one or more previously defined applications will be selected. In an embodiment, the Deep Packet Inspection module (DPI) may be configured to first select one of the previously defined application that has traffic most similar to the new application and then to select characteristics of the new application that distinguishes it from the most similar application, optionally after prompting the user to ask whether the applications may be treated in the same way.

In an embodiment, the Deep Packet Inspection module (DPI) may be configured to keep record of packets transmitted to or from the user domain during the derivation step of respective applications. In this embodiment, the Deep Packet Inspection module (DPI) may be configured to compare information from packets detected in derivation steps for different applications and to use the comparison to select derived characteristics that distinguish traffic for different applications.

In an embodiment, the Deep Packet Inspection module (DPI) may be configured to resume the learning phase for an application when it is found that the previously derived characteristics do not suffice to distinguish traffic for that application. In the resumption, the user may start a new session of execution of the application may, and the Deep Packet Inspection module (DPI) may be configured to use additional packets to and/or from user domain during the derivation step to derive additional characteristics. In one embodiment, this may be used to define alternative (disjunctive) conditions for triggering enforcement. For example, a condition for triggering enforcement may be that packet destination or source addresses of packets from or to the user domain and/or port numbers equal any one of a set of reference addresses and/or port numbers. In this embodiment, the Deep Packet Inspection module (DPI) may be configured to derive different reference addresses and/or port numbers of this set in executions of the derivation step in an initial learning phase and resumptions of the learning phase. Similarly, the Deep Packet Inspection module (DPI) may be configured to derive more refined characteristics by combining records of packets received in different executions of the derivation step for the same application.

In an embodiment the network domain may comprise a storage device storing a database with a list of records that each associate an application type to characteristics to be used for triggering and optionally an identification of a required quality of service policy and/or parameters of such a policy. A list of records may be kept stored associating users with selected ones of the application types and optionally identifications of required quality of service policies and/or parameters of such policies for different application types. In this embodiment information from the lists in the storage device may updated as part of the derivation step and used for triggering and during enforcement. In an embodiment a list of addresses of servers may be stored to represent applications, with associated quality of service policies. In this embodiment a list of users, each with a list of servers may be stored.

Although embodiments have been described wherein triggering of enforcement of a quality of service policy and enforcement are different operations, executed by different units in the communication network, it should be appreciated that in an alternative embodiment they part of the same operation. In this embodiment, a quality of service policy for a specific type of application may be active in the Resource and Admission Control Sub-system (RACS) for example, detection of packet traffic that matches the derived characteristics triggering application of the quality of service policy to the detected packets of the traffic. Alternatively, as described, triggering and enforcement for individual packets may be distinct actions, for example because triggering is used to reserve bandwidth for future packets, or because triggering is used to cause a separate action other than handling of detected packets to be performed, such as activation of the selected quality of service enforcement policy.

The user domain may reside behind a network address translation function (NAT), which may be part of a firewall. By detecting packets in the network, on the side of NAT or the firewall opposite the user domain, both in the derivation step and during triggering of enforcement, the effect of the firewall on enforcement of quality of service policies can be reduced.

In an embodiment, an SLQC client may be used that has access to the operating system of the user equipment. In this embodiment the SLQC client may be configured to derive part of the characteristics for triggering enforcement automatically from the operating system, rather than from packets. This may include for example identifiers of the application name, version number, application type, etcetera. In this embodiment this information may be used in the fifth step 35, a derivation of these characteristics being omitted.

Although embodiments have been shown wherein a Resource and Admission Control Sub-system (RACS) is used to enforce selected quality of service policies when enforcement is triggered, it should be understood that alternatively or in parallel explicit quality of service signalling could be triggered, e.g. using ATM SVCs or IntServ. Similarly, although embodiments have been shown wherein Deep packet Instrpxtion (DPI) is use to the trigger enforcement, it should be appreciated that any form of packet inspection could be used for triggering, dependent on the characteristics that are used for triggering.

As described, inspection is applied to packets transmitted through the network to and/or from the user domain, for example by a Deep packet Inspection module (DPI), but any other type of inspection module may be used. The results of this inspection are used to trigger enforcement of a quality of service policy that has been defined in conjunction with conditions for said triggering. The quality of service policy is enforced for example by a Resource and Admission Control Sub-system (RACS), which controls operational settings that affect quality of transmission of selected packets, such as reservation of bandwidth for these packets or an optional limit on bandwidth that may be used for these packets, but any other network resource control sub-system may be used.

A learning phase may be started by a signal from the user, wherein packet inspection, for example by Deep Packet Inspection module (DPI), is used to derive characteristics of a type of data flow that will be used for triggering, but any other type of inspection module may be used. In this learning phase, the user may additionally specify the required quality of service. As used herein, the term "characteristics" refers to any set of one or more parameters used for matching with packet traffic for triggering. Usually, each parameter will be represented by a plurality of bits.

Optionally, the required quality of service, or parameters needed to realize the required quality of service may also be derived in the learning phase, based on observations of traffic during the derivation step, for subsequent use to define the required quality of service during enforcement for a specific type of data flow. But this should be distinguished carefully from derivation of the characteristics that will be used to trigger the enforcement of the quality of service policy for the specific type of data flow.

An embodiment may be described in terms of the following specification. In this embodiment operation of Network Based Access Control involves the phases of 1) Network Triggering Activation, 2) Network Pattern Triggering, 3) Pattern Analysis & Service Discovery, 4) Capability and Service Binding, 5a) Capability Offer and 5b) Capability Offer response, 6) Capability Enforcement . Phase (1) provides the appropriate configuration for a triggering function executed at network level and pattern analysis and service discovery function executed at control level. The provisioning can start from a specific application function, for example with an interaction via a portal. In this phase the patterns are provided that have to be inspected on the traffic and the associated service templates, which will allow attributing a specific user flow to a specific service.

After the provisioning phase, when a packets inspection module detects a configured pattern on the traffic, an event signal is generated and analysis module analyzes one or more events signals and, if possible, attributes them to a service. The information about the service is then passed to a capability and service binding module in the third phase. This module selects the appropriate capability that can be potentially bound to the user service. The module assures that all the pre-conditions needed for binding the capability to the user service are verified. Optionally the module sends an offer single to the application function request acceptance or refusal of the offer (phase 5a). When the application function returns an acceptance signal in the capability offer response phase (5b), the module triggers the start of the enforcement phase (6) of the capability by a capability enforcement module. Alternatively, the enforcement phase may be started without offer and acceptance. In the enforcement phase the capability enforcement module provides all the needed configuration for acting on the service flows.

Network Triggering Activation is performed via provisioning. Several scenarios may be considered for provisioning, which will be called scenarios A, B and C.

Figure 7:
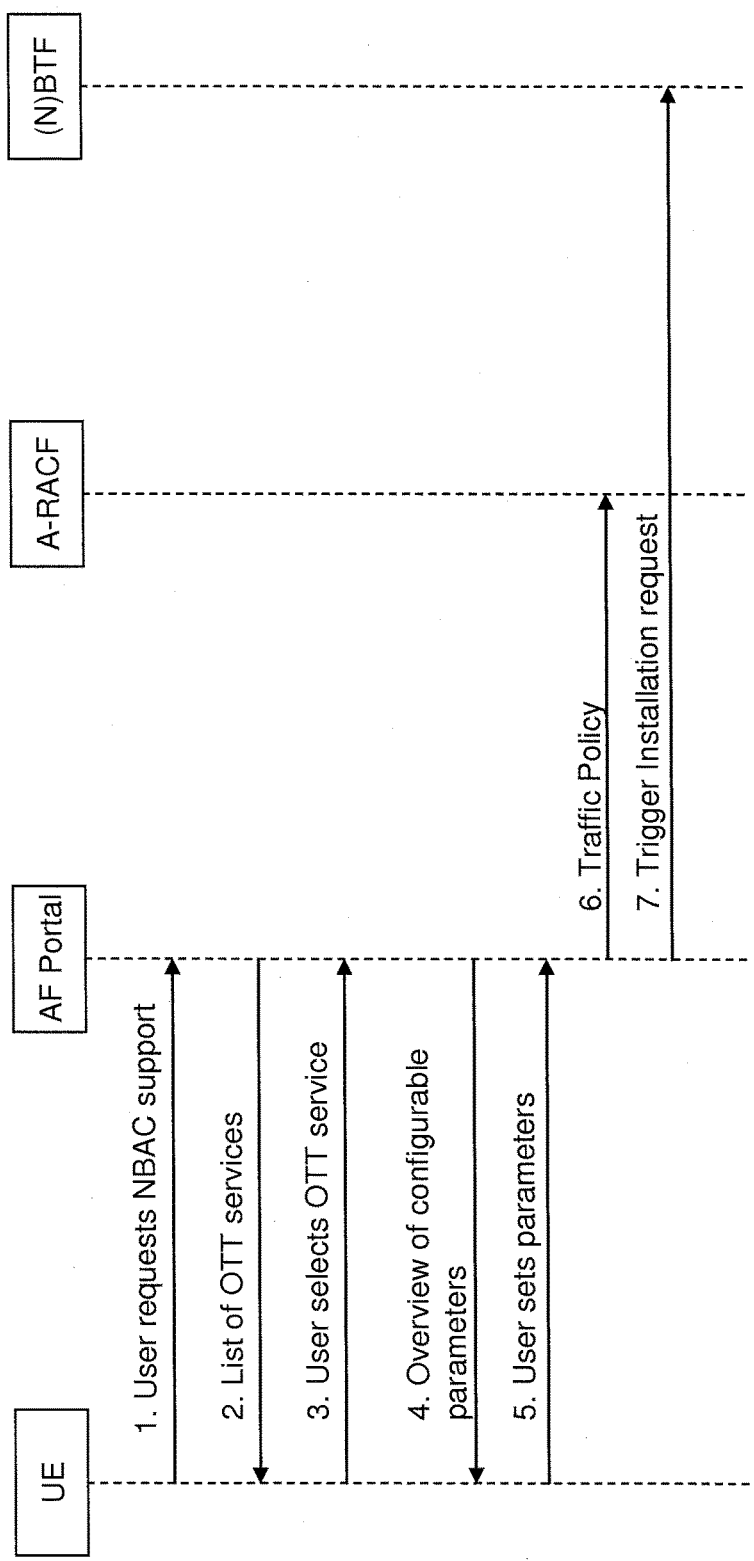
FIGS. 7-9 show signalling in three different scenarios

Scenario A assumes a knowledgeable user In scenario A, the user selects an over-the-top (OTT) service from a list from a list provided by the Application Function Portal (AF Portal). FIG. 7 illustrates signaling involved in this scenario, for Network Trigger Activation by selecting service from a list.

1. UE sends a request for NBAC support to AF Portal
2. AF Portal responds with a list of supported OTT services
3. UE selects the OTT service for which NBAC support is needed
4. AF Portal confirms the selection and provides an overview of configurable parameters, e.g. bandwidth
5. UE sets the parameters
6. AF Portal configures A-RACF with a Traffic Policy, based on the selected OTT service and configured parameters
7. AF Portal sends a Trigger Installation request to (N)BTF for the selected OTT service.

Using this trigger, the (N)BTF activate the Service Template which will allow attributing a specific user flow to the specific OTT service.

Figure 8:
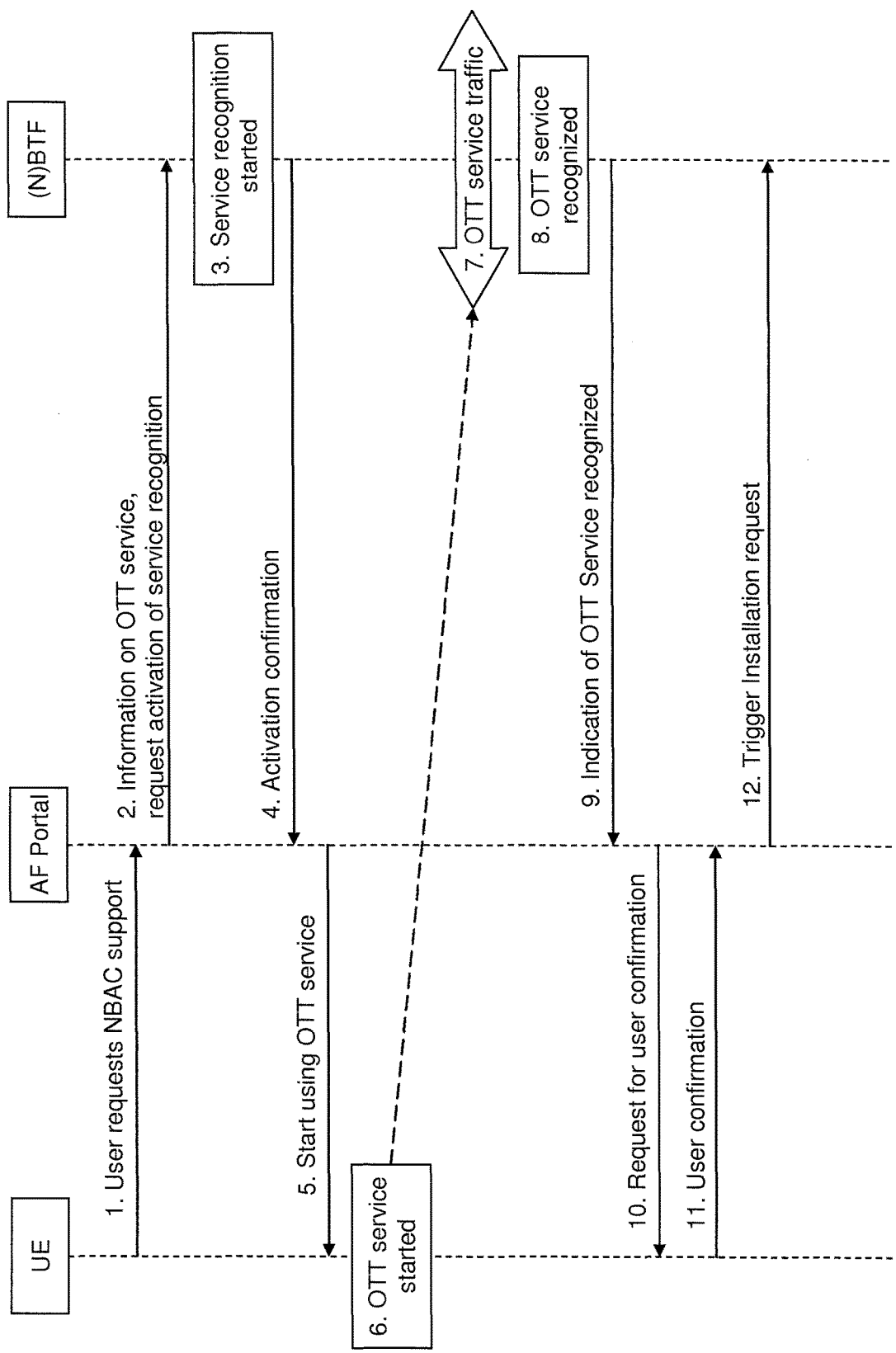

Scenario B represents a self-learning approach that minimizes the specialized effort required from the user. In scenario B, the user requests NBAC support for "this OTT service". The (N)BTF functionality is used to learn what the user means by "this". Signaling in this scenario is shown in FIG. 8, for Network Trigger Activation by traffic recognition.

1. UE sends a request for NBAC support to AF Portal
2. AF Portal requests (N)BTF to activate the service reciognition functionality and start trying to detect new traffic from/to the identified user
3. De (N)BTF makes a snapshot of the traffic types currently running to/from the user, and starts looking for new traffic
4. (N)BTF confirms to AF Portal
5. AF Portal requests UE to start the OTT service for which NBAC support is needed. It may also request the user to suspend all other services in order to aid the service recognition process.
6. UE starts the OTT service
7. This results in OTT service traffic from and to the UE, passing the (N)BTF
8. (N)BTF recognizes the OTT service traffic, and stops detection NOTE: A wide variety of parameters may be used to identify the OTT service, which include user info (IP address, other access info), service info (IP addresses, port numbers, URLs, service identification, protocol identification), specific protocol info (e.g. carried in sip invite, igmp join/leave and rstp Play/Stop messages), etcetera.

9. (N)BTF indicates to AF Portal which OTT service was recognized

10. AF Portal notifies UE and optionally request confirmation from UE

11. UE confirms to AF Portal

12. AF Portal sends a Trigger Installation request to (N)BTF for the selected OTT service.

Figure 9:
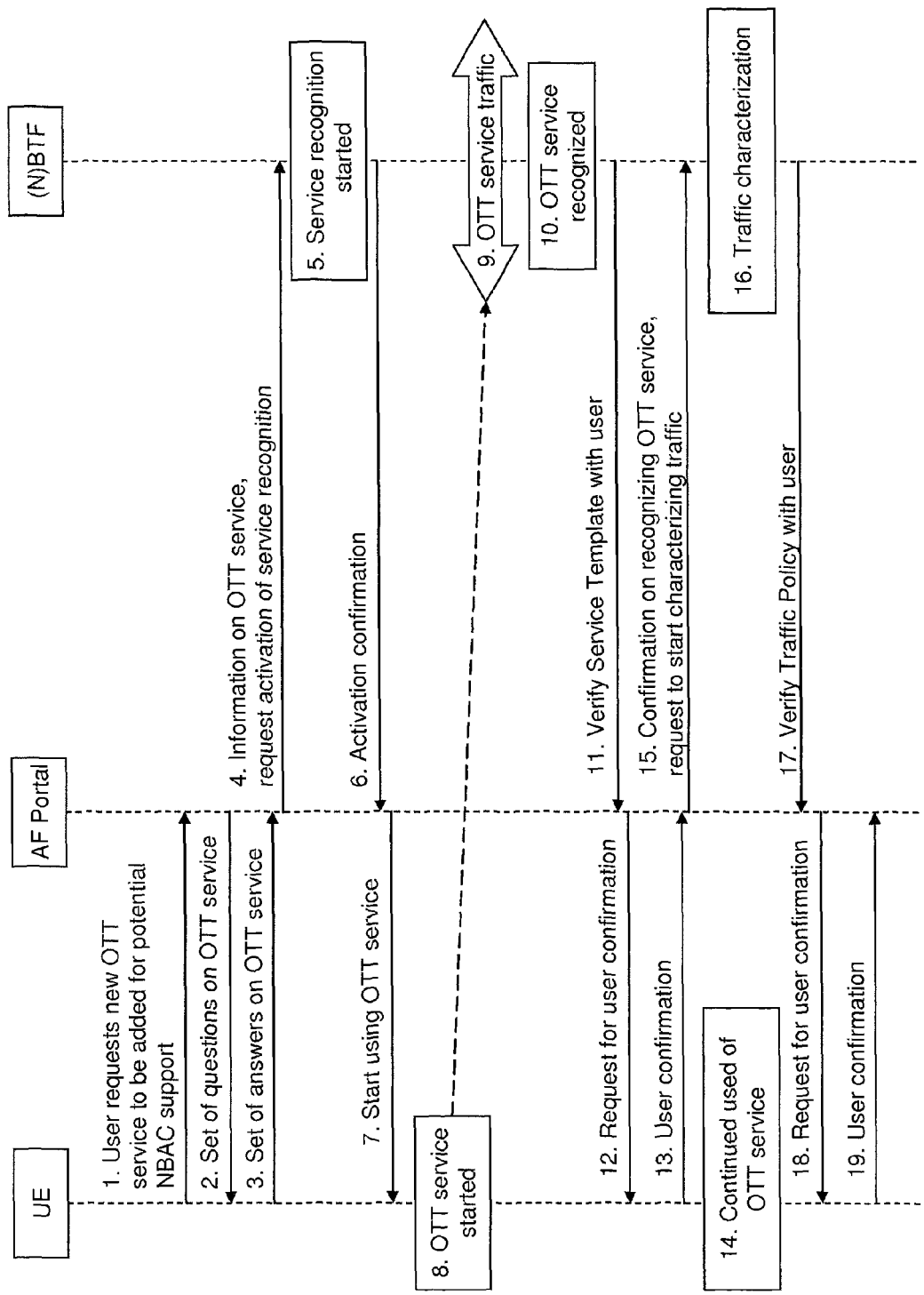

Scenario C is the most advanced scenario. Scenario C helps the user and the network provider to extend the list of OTT services that are supported by NBAC. The scenario requires an advanced, motivated user. Scenario C starts at the point where scenarios A and B have failed, and the conclusion has been made that the specific OTT services is not yet recognized or supported by the NBAC system ("It is not on the list"). In scenario C, the user wants to add an OTT service for NBAC support that is not previously known to the NBAC system. A combination of configuration by the user and self-learning is used. Signaling of scenario C is shown in FIG. 9, for adding a new OTT service for NBAC support.

1. UE sends a request to AF Portal to add a new OTT service for potential NBAC support.

2.-3. In a series of Q&E, UE characterizes the OTT service to the AF Portal. This may include the following aspects.

a. Naming the OTT services for the context of NBAC b. Providing parameters to create a Service Template that can be used to recognize traffic from the OTT service c. Providing parameters that characterize the traffic, to be used to create a Traffic Policy for the OTT service (QoS parameters, like bandwidth, delay or jitter)

If the user input is sufficiently complete to create the Service Template and Traffic Policy for the new OTT service, then these are created and stored, and the scenario ends. Assuming incomplete input, self-learning by the (N)BTF may be used to complete the process.

4. AF Portal requests (N)BTF to activate the service recognition functionality and start trying to detect new traffic from/to the identified user 5. De (N)BTF makes a snapshot of the traffic types currently running to/from the user, and starts looking for new traffic 6. (N)BTF confirms to AF Portal 7. AF Portal requests UE to start the OTT service for which NBAC support is needed. It may also request the user to suspend all other services in order to aid the service recognition process.

8. UE starts the OTT service

9. This results in OTT service traffic from and to the UE, passing the (N)BTF 10. (N)BTF creates and stores a Service Template based on the passing OTT service traffic. This Service Template can be used by the (N)BTF to recognize traffic from the specific OTT service.

11. (N)BTF sends the Service Template to the AF Portal for verification.

12. AF Portal provides feedback to UE on the Service Template and request conformation (and possible modification)

13. UE sends a confirmation to the AF Portal. Consequently, AF Portal provisions the NBAC system with the new Service Template.

At this point, the NBAC system knows how to recognize traffic from the new OTT service. However, it may not yet know the properties of the OTT service traffic and the associated Traffic Policy. Also this may be obtained through a self-learning process.

14. UE continues using the OTT service

15. AF Portal confirms the Service Template for recognizing the OTT service traffic, and requests (N)BTF to start characterizing the traffic.

16. (N)BTF characterizes the traffic and creates a Traffic Policy

NOTE: (N)BTF could e.g. measure the average bandwidth consumed, the variability of the bandwidth consumed, and typical times between up- and downstream messages of the OTT service to get an indication of the required responsiveness.

17. (N)BTF sends the Traffic Policy to the AF Portal for verification.

18. AF Portal provides feedback to UE on the Traffic Policy and request conformation (and possible modification)

19. UE sends a confirmation to the AF Portal. Consequently, AF Portal provisions the NBAC system with the new Traffic Policy.

From this point, the NBAC service knows how to recognize the new OTT service traffic (Service Template) and it knows what Traffic Policy should be applied. Now, the user can request NBAC support for the new OTT service using scenarios A or B.

The invention claimed is:

1. A method of transporting data through a communication network wherein different quality of service policies are enforced in the communication network for packet traffic associated with different types of user applications, the method comprising a learning phase and an operation phase, the learning phase comprising
   receiving an indication of a quality of service policy that is required for a selected type of user application;
   receiving an indication indicating an execution of said selected type of user application in a user domain;
   deriving characteristics of packet traffic from inspection of packets transmitted through the communication network to and/or from the user domain during the execution of said selected type of user application, to obtain derived characteristics of packet traffic, and associating the derived characteristics with said selected type of user application, the derived characteristics including at least one of reference addresses, port numbers, and protocol labels;
the operation phase being executed later than the execution of said selected type of user application in the learning phase and comprising
   inspecting packet traffic in the communication network to and/or from the user domain;
   detecting whether observed characteristics of the packet traffic match the derived characteristics; and, in response to detection of a match between the observed characteristics and the derived characteristics,
   triggering enforcement of said quality of service policy in the communication network to said packet traffic for which said match is detected.

2. The method according to claim 1, comprising starting the learning phase in response to a signal from a user.

3. The method according to claim 2, comprising receiving a request to start the learning phase, the request comprising information about the application, the information about the application being supplied by the user, and starting the learning phase in response to the request.

4. The method according to claim 1, comprising transmitting a message to a user to start the user application of the selected type for use in said learning phase.

5. The method according to claim 1, comprising deactivating applications executed in the user domain that are not of the selected type before derivation of the characteristics during the learning phase.

6. The method according to claim 1, comprising sending a command from the user domain to the communication network to command execution of said deriving characteristics of packet traffic.

7. The method according to claim 1, wherein said deriving of characteristics and said detecting are performed by a Deep Packet Inspection module and wherein enforcement of the quality of service policy is performed by a Resource and Admission Control Sub-system.

8. The method according to claim 1, comprising reserving bandwidth for transmission of future packets of the selected type of user application in response to the detection.

9. The method according to claim 1, comprising changing criteria for selection of treatment of individual packets in traffic from the selected type of user application in response to the detection.

10. A communication system for transporting data through a communication network wherein different quality of service policies are enforced in the communication network for packet traffic associated with different types of user applications, the communication system comprising:
   a self learning quality of service hardware control system, configured to cause characteristics of packet traffic, including at least one of reference addresses, port numbers, and protocol labels, from inspection of packets transmitted through the communication network to and/or from a user domain to be derived during a time interval for which is has been indicated that a selected type of user application is executed in the user domain, and further configured to associate said characteristics with said selected type of user application;
   an inspection hardware module, configured to detect, subsequent to the time interval, a match between observed characteristics of packet traffic and said characteristics derived from the inspection of the packets during the time interval;
   a resource hardware control sub-system configured to enforce a quality of service policy required for said selected type of user application in the network in response to a detection of a match between the observed characteristics and the characteristics derived from the inspection of the packets during the time interval.

11. The communication system according to claim 10, wherein the self learning quality of service hardware control system is configured to start derivation of the characteristics, from the inspection of the packets during the time interval, in response to a signal from a user.

12. The communication system according to claim 11, wherein the self learning quality of service hardware control system is configured to cause the derivation of the characteristics, from the inspection of the packets, to be executed in response to a request to start the learning phase, the request comprising information about the application, the information about the application being supplied by the user.

13. The communication system according to claim 10, wherein the self learning quality of service hardware control system is configured to transmit a message to a user to start the user application of the selected type, prior to starting derivation of the characteristics from the inspection of the packets during the time interval.

14. The communication system according to claim 10 said inspection hardware module comprises a Deep Packet Inspection module and wherein said resource control sub-system comprises a Resource and Admission Control Sub-system.

15. The communication system according to claim 14 wherein the Deep Packet Inspection module is configured to execute the derivation of the characteristics, from the inspection of the packets, under control of the self learning quality of service hardware control system.

16. The communication system according to self learning quality of service hardware control system claim 14, wherein the resource hardware control sub-system is configured reserve bandwidth for transmission of future packets of the selected type of user application in response to the detection of a match between the observed characteristics and the characteristics derived from the inspection of the packets during the time interval.

17. The communication system according to claim 14, wherein the resource hardware control sub-system is configured to change criteria for selection of treatment of individual packets in traffic from the selected type of user application in response to the detection of a match between the observed characteristics and the characteristics derived from the inspection of the packets during the time interval.

18. The communication system according to claim 14, wherein the self learning quality of service hardware control system, is located at least partly in a communication network inside a user domain coupled to a terminal of the communication network, but outside the communication network, the self learning quality of service hardware control system having an input channel for receiving commands to execute derivation of characteristics of the packets transmitted through the communication network to and/or from a user domain.

19. A computer program product, comprising a non-transitory computer readable medium having a computer program embodied thereon, the computer program including instructions for a programmable processor that, when executed by the programmable processor will cause the programmable processor to execute the method according to claim 1.

20. A method of transporting data through a communication network wherein different quality of service policies are enforced in the communication network for packet traffic associated with different types of user applications, the method comprising
   executing a learning phase and an operation phase, wherein a server learns derived characteristics of packet traffic associated with execution of a selected type of user applications and enforces a quality of service policies required for the selected type of user application respectively, the learning phase comprising
   receiving an indication of the quality of service policy that is required for said selected type of user application;
   receiving an indication of a time interval for which it is indicated that said selected type of user application is executed in a user domain in said time interval;
   deriving said derived characteristics of packet traffic from inspection of packets transmitted through the communication network to and/or from the user domain in said time interval, and associating the derived characteristics with said selected type of user application, the derived characteristics including at least one of reference addresses, port numbers, and protocol labels;
   the operation phase, executed subsequent to said time interval, comprising inspecting packet traffic in the communication network to and/or from the user domain subsequent to said time interval;

detecting whether observed characteristics of the packet traffic match the derived characteristics; and, each time when a match between the observed characteristics and the derived characteristics is detected, in response to detection of the match, triggering an enforcement phase wherein, based on the detection of the match, the quality of service policy that is required for the selected type of user application is selected as a quality of service policy to be enforced in the communication network to the subsequent packet traffic during the enforcement phase.

21. The method of claim 20, wherein said detecting during the operation phase subsequent to said time interval is applied selectively to only the observed characteristics of the packet traffic from said user domain, wherein the user domain represents a single user terminal device or a home network with a plurality of interconnected devices.

22. The method of claim 20, wherein the operation phase is executed multiple times subsequent to said time interval, based on the derived characteristics derived in the learning phase.

23. The method of claim 20, further comprising triggering one or more further enforcement phases, corresponding to further indications of further time intervals for which it is indicated that said user application of said selected type is executed.

24. A communication system for transporting data through a communication network wherein different quality of service policies are enforced in the communication network for packet traffic associated with different types of user applications, the communication system comprising a self learning quality of service hardware control system, configured to derive derived characteristics of packet traffic associated with execution of a selected type of user applications, and including at least one of reference addresses, port numbers, and protocol labels, from inspection of packets transmitted through the communication network to and/or from a user domain during a time interval for which is has been indicated that said selected type of user application is executed in the user domain;

an inspection hardware module, configured to detect, subsequent to the time interval, matches between observed characteristics of subsequent packet traffic and characteristics derived from the inspection of the packet traffic during the time interval;

a resource hardware control sub-system configured to start an enforcement phase wherein the quality of service policy indicated required for said selected type of user application is selected as a quality of service policy to be enforced in the network during the enforcement phase, each time when the inspection module detects one of said matches during a monitoring phase prior to the enforcement phase, in response to the detection of said one of the matches.

25. The communication system of claim 22, wherein the inspection hardware module is configured to detect said matches selectively from only the observed characteristics of the packet traffic from said user domain.

26. The communication system of claim 22, wherein the inspection hardware module is configured to detect said matches multiple times subsequent to said time interval, based on the characteristics derived from the inspection of the packets during said time interval.

27. The communication system of claim 22, wherein the resource hardware control sub-system is configured to start one or more further enforcement phases, corresponding to further indications during said time intervals for which is has been indicated that said application of said selected type is executed in the user domain.

* * * * *